April 5, 1927.
A. W. KOGSTROM
1,623,845
END CONNECTION FOR VEHICLE SPRINGS
Filed March 30, 1925
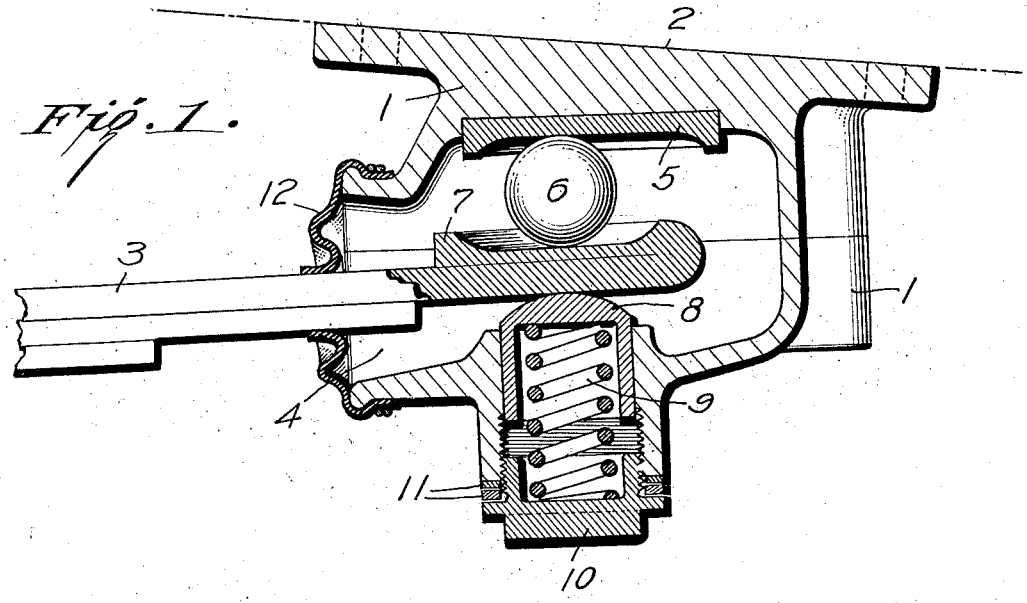
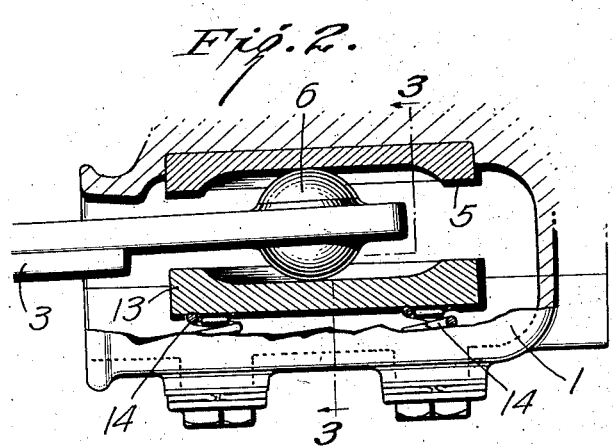
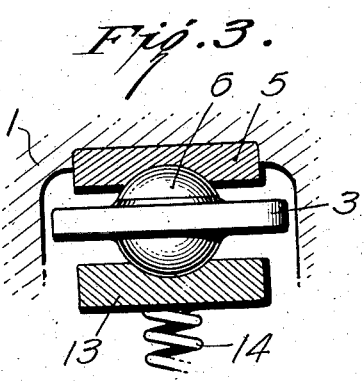
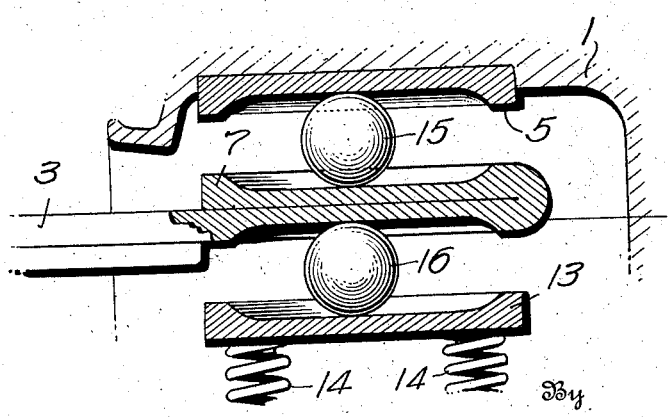
Inventor
Axel W. Kogstrom
by
Attorney Patented Apr. 5, 1927.

1,623,845

UNITED STATES PATENT OFFICE.

AXEL W. KOGSTROM, OF UPPER DARBY, PENNSYLVANIA, ASSIGNOR OF ONE-HALF TO ALLISON F. H. SCOTT, OF PHILADELPHIA, PENNSYLVANIA.

END CONNECTION FOR VEHICLE SPRINGS.

Application filed March 30, 1925. Serial No. 19,394.

This invention relates to certain improvements to means for connecting the end of a leaf-spring to the chassis or frame of a vehicle; and specifically to such a connection which permits of the longitudinal flexing of the spring as is provided for in the ordinary shackle form of end connector.

The object of the invention is to provide means so constructed that wear on the parts at bearing points of such a connection is reduced to a minimum thus to prolong their useful life; and further to provide a connection which permits of the spring flexing in all directions without transmitting torsional stresses to the frame of the vehicle. By eliminating such stresses from the chassis, there results improved riding qualities in the vehicle to which the construction is applied, as well as a substantial reduction in the amount of twisting and racking to which a vehicle chassis is subjected by reason of the more rigid connections of the ordinary shackle type end connectors for springs.

Another object of this invention is to provide a form of connector the bearings of which require only occasional lubrication or attention. The housing for the connector is constructed to receive a gaiter or boot of flexible material which will function to retain a quantity of grease or other lubricant surrounding the bearing ports.

It is the usual construction, especially on motor vehicles, to connect the springs to the chassis in such a way that one end is fastened by a horizontal pin or hinge connection while the opposite end is similarly supported in a so-called shackle to permit longitudinal flexing of the spring. Such shackle usually comprises parallel depending arms hinged at their upper ends to the side frame of the vehicle, while their lower ends are connected by a pin to which the end of the spring is also secured. In connections of this kind, the bearing surfaces are relatively large, require constant lubrication, and at best soon become worn and rattle with every jolt or jar to which the vehicle is subjected. Furthermore, with this usual type of connection each torsional movement of the spring is transmitted, as a stress or strain, to the chassis or frame of the vehicle, with the result that there is a force exerted tending to twist or rack the frame whenever any wheel of the vehicle rides over an obstruction or enters a depression in the road way.

In the present invention the enumerated disadvantages are overcome to a large extent by providing a form of connection which is in general a ball bearing with only limited areas of surface contact for wear, and which permits of substantially universal movement of the spring without transmitting such movement to the vehicle frame. Further, the spring is connected to permit its flexing longitudinally while maintaining the same assembly relationship as above described. The further advantages and specific details of my invention will now be described in connection with the accompanying drawing which forms a part of this specification, and in which:

Fig. 1 is a sectional view of a preferred form of the invention;

Fig. 2 is a partial section of a slightly modified form of the connection;

Fig. 3 is a transverse sectional view on the line 3—3 of Fig. 2; and

Fig. 4 is a sectional view of a further modification of the invention which combines certain of the features of the construction of Figs. 1 and 2.

Referring first to the construction of Fig. 1, the housing element for the connector is shown at 1. This may be constructed as a hollow casting with a plane upper surface 2 for attaching to the underside of the bottom flange of the side sill of the chassis frame. The end of the vehicle spring 3, extends into the interior of the casting 1 through the flaring opening 4, and the cored out part of the casting is of sufficient length to permit the spring end to extend therein, without contact with the end wall, when the spring is flattened or flexed to the limit under loading. A bearing member 5, is fixed within the casting, and presents a grooved bearing surface on its under side. The groove is circular in contour and extends longitudinally of the bearing, but not to the full length thereof, leaving stops or abutments at each end for a purpose which will be hereinafter described. The bearing member 5 may be formed of any suitable bearing metal, hardened steel or bronze, for example.

A hardened steel ball 6, contacts with the bearing 5 and is interposed between it and the upper surface of the spring 3. The latter is formed to provide a lower bearing for the ball 6, by bending over the end of the top leaf, as at 7, and grooving the upper surface of the bent-over part to complement the groove in the bearing 5. The depth of the two grooves may be substantially equal, but it is preferred to make the lower bearing groove of somewhat greater depth than that of the bearing 5. It will now be apparent that when the connection is assembled the load of the vehicle is transmitted to the spring through the ball 6, and that as the spring flexes under changing loads and road conditions, the spring will extend more or less into the housing and the ball will roll between bearings 5 and 7 with very little friction. The ends of the grooves in the bearings tend to limit the travel of the ball, but these are beyond the ordinary travel and are primarily intended to prevent displacement of the ball 6 under unusual circumstances.

The assembly of the connection above described is aided by a lower bearing member 8, the upper rounded end of which is spring pressed against the under side of the spring 3. This bearing member 8 is a hollow cylinder guided for vertical movement in a cored opening in the casting 1. A compression spring 9, presses the bearing 8 against the spring 3, the compression spring being adjustably supported at its lower end by a threaded closure member 10 for the bottom of the vertically arranged cored opening in the casting 1. Washers 11, to any desired number, are interposed between the cap 10 and the casting, so that by increasing or decreasing their number, it is possible to adjust the compression of the spring 9. Such adjustment is made to compensate for wear on the several bearing surfaces, and in this way contact can be maintained between the ball and the bearings between which it moves. This is important in order to reduce the noise and clatter occasioned by loose connections.

The hollow part of the casing 1, is preferably filled or packed with lubricant which is retained by a boot or gaiter 12 of flexible material secured to the rim of the flared opening 4, and closely encircles the spring 3.

In Fig. 2, the arrangement just described is modified in such a way that in place of a rolling bearing, there is sliding engagement of the ball 6, with the bearings. In this construction the housing 1 and upper bearing are substantially as described in connection with Fig. 2. The hardened steel ball 6, however, is mounted in and carried by a leaf of the spring 3. To securely fasten the ball in the spring to resist the shearing stress tending to separate it therefrom when under load, the metal of the spring surrounding the ball may be upset in a way to partially surround the ball. Other fastening means will be obvious, however, and any construction may be adopted which will securely retain the ball in the end of the spring leaf in the relative arrangement shown in the drawing. The lower bearing 13 is yieldably supported by springs 14, one at the either end, and as in Fig. 1, the principal function of this lower bearing is to maintain the ball in contact, at all times, with the upper bearing 5. The springs 14 are normally under compression, and their degree of compression is adjustable in the same way as described in connection with the spring 9 of Fig. 1.

In Fig. 4 the rolling contact idea of Fig. 1 is embodied in a slightly different form. Here two hardened steel balls 15 and 16 are employed and so far as the upper one 15 of these is concerned, the action of the elements is the same as in the construction illustrated at Fig. 1. The lower ball 16 is interposed between the under side of the spring 3 and a yieldably supported bearing member 13 so that as the spring flexes both balls will roll in grooved bearings and friction at all points will be appreciably reduced.

In assembling the connector of any of the constructions shown, it is only necessary to drop the lower bearing as by removing the cap 10, of Fig. 1, when the end of the spring can be inserted into the casting with the ball in proper position, after which the lower bearing member can be positioned and adjusted so that the maintenance of the assembly is assured. In each of the constructions shown, provision is made to allow for such flexing of the spring as tends to increase its length, while still supporting the load; and the extent of the contacting bearing surfaces is substantially reduced over the known constructions. In addition the connection is so arranged that the torsional forces transmitted to the spring from the vehicle axles which tend to twist the spring, cannot be transmitted to the vehicle frame through its connection with the spring.

What I claim as new and desire to secure by Letters Patent, is:

1. A shackle type of end connector for a vehicle spring comprising a bearing member carried by the vehicle frame and a single hardened steel ball mounted to traverse said bearing and interposed between it and one end of the spring whereby the weight of the vehicle and its load is transmitted to the spring through said ball and whereby the spring is capable of universal movement with respect to the bearing.

2. A shackle type of end connector for a vehicle spring comprising a longitudinally grooved bearing member carried by the vehicle frame, and a single hardened steel ball mounted to traverse the said groove and interposed between it and one end of the spring whereby the weight of the vehicle and its load is transmitted to the spring through said ball and whereby the spring is capable of universal movement with respect to the bearing.

3. An end connection for securing a leaf spring to the frame of a vehicle to permit lengthening of the spring in flexing, comprising a horizontally supported bearing member secured to the vehicle frame, a single hardened steel ball supported to traverse said bearing member when the spring is lengthened in flexing and so supported with relation to the spring that the load of the vehicle is transmitted to the spring through said ball and whereby the spring is capable of universal movement with respect to the bearing.

4. A shackle type of end connector for a vehicle spring comprising a bearing member carried by the vehicle frame, a hardened steel ball mounted to traverse said bearing and interposed between it and one end of the spring whereby the weight of the vehicle and its load is transmitted to the spring through said ball, and a second bearing member which is spring supported and connected with the vehicle frame, to exert a yielding force in the direction to maintain the ball in contact with the first named bearing.

5. In a shackle type of end connector for a vehicle spring comprising a hollow housing or casing secured to the vehicle frame with an opening at one end through which the spring element extends into the housing, an upper bearing member fixed within the housing and extending longitudinally thereof, a single hardened steel ball mounted to traverse said bearing member and interposed between it and the vehicle spring whereby the weight of the vehicle and its load is transmitted to the spring through said ball and whereby the spring is capable of universal movement with respect to the bearing.

6. In a shackle type of end connector for a vehicle spring, comprising a hollow housing or casing secured to the vehicle frame with a flared opening at one end through which the end of the spring element extends into the housing, bearing members supported within the housing and a single ball element interposed between one bearing and the spring to transmit the weight of the vehicle and its load to the spring, the ball being supported to traverse the bearing by rolling contact therewith when the spring is flexed to lengthen the same and the spring being capable of universal movement with respect to the bearing member.

7. In a shackle type of end connector for a vehicle spring, comprising a hollow housing or casing secured to the vehicle frame with an opening at one end through which the end of the spring element extends into the housing, upper and lower bearing members supported within the housing and a hardened steel ball interposed between the upper bearing and the spring to transmit the weight of the vehicle and its load to the spring, the ball being supported to traverse the said upper bearing by rolling contact therewith when the spring is lengthened by flexing and the lower bearing member being spring supported and exerting a yielding pressure in the direction to maintain the ball in contact with the upper bearing member.

8. In a shackle type of end connector for a vehicle spring comprising a housing or casing for attachment to the vehicle frame with a flared opening at one end through which the end of the spring element extends into the housing, upper and lower bearing members supported within the housing, the upper bearing member being longitudinally grooved on its under face, a hardened steel ball interposed between the upper bearing and the spring to transmit the weight of the vehicle and its load to the spring, a grooved bearing surface supported by the vehicle spring at the outer end thereof and which cooperates with the upper bearing member to form a race or track with which the ball makes rolling contact when the length of the spring is changed by flexing, and the lower bearing member being spring supported and exerting a yielding adjustable pressure in the direction to maintain contact between the vehicle spring and ball and between ball and upper bearing member.

9. An end connection for securing a leaf spring to the frame of a vehicle to permit lengthening of the spring in flexing, comprising a bearing member secured to the frame and having a longitudinal groove formed therein, a complementary bearing element formed on one end of the leaf spring, and having formed therein a longitudinal groove and a ball element inserted between said bearing elements and adapted to traverse said grooves upon flexing of the spring and to restrain the spring against lateral movement.

10. An end connection for securing a leaf spring to the frame of a vehicle to permit lengthening of the spring in flexing, comprising a bearing member secured to the frame and having a longitudinal groove formed therein, a complementary bearing element formed on one end of the leaf spring and having formed therein a longitudinal groove, and a ball element inserted between said bearing elements and adapted to traverse said grooves upon flexing of the spring and means to retain the ball in the grooves comprising a resilient element pressing the bearing members together.

AXEL W. KOGSTROM.